United States Patent
Oemler et al.

(10) Patent No.: US 10,216,493 B2
(45) Date of Patent: Feb. 26, 2019

(54) DISTRIBUTED UI DEVELOPMENT HARMONIZED AS ONE APPLICATION DURING BUILD TIME

(71) Applicant: SAP SE, Walldorf (DE)

(72) Inventors: Michael Oemler, Rauenberg (DE); Sebastian Netuschil, Sankt Leon-Rot (DE); Volker Obry, Neustadt Weinstrabe (DE); Pierre Fritsch, Karlsruhe (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/361,304

(22) Filed: Nov. 25, 2016

(65) Prior Publication Data

US 2018/0150285 A1    May 31, 2018

(51) Int. Cl.
  *G06F 9/44*   (2018.01)
  *G06F 8/38*   (2018.01)
  *G06F 8/36*   (2018.01)

(52) U.S. Cl.
  CPC . *G06F 8/38* (2013.01); *G06F 8/36* (2013.01)

(58) Field of Classification Search
  CPC .................................................. G06F 8/38
  USPC .......................................................... 717/122
  See application file for complete search history.

(56) References Cited

U.S. PATENT DOCUMENTS

| | | | |
|---|---|---|---|
| 8,826,260 B2 * | 9/2014 | Ran | G06F 8/60 717/168 |
| 2004/0068713 A1 * | 4/2004 | Yannakoyorgos | G06F 11/3672 717/101 |
| 2010/0175044 A1 * | 7/2010 | Doddavula | G06F 8/38 717/104 |
| 2015/0052496 A1 * | 2/2015 | Helms | G06F 8/34 717/109 |

* cited by examiner

*Primary Examiner* — Wei Y Zhen
*Assistant Examiner* — Lanny N Ung
(74) *Attorney, Agent, or Firm* — Mintz Levin Cohn Ferris Glovsky and Popeo, P.C.

(57) ABSTRACT

A system and method to develop a harmonized UI application is presented, giving the teams the freedom of having their own code repository and bringing the functionality together during build steps to have one consistent application facing the external consumers. Multiple applications are reachable via the same web address in the same context without having each team to contribute to the same code repository. Team-specific development processes are isolated from a central build process, allowing each team to develop and test their part of the overall application.

14 Claims, 4 Drawing Sheets

DISTRIBUTED UI DEVELOPMENT HARMONIZED AS ONE APPLICATION DURING BUILD TIME

TECHNICAL FIELD

The subject matter described herein relates to user interface application development, and more particularly to distributed user interface development that is harmonized by a computing system as one application during build time.

BACKGROUND

An application is a computer program written in computer code by one or more programmers, and which is executable by a computer to perform a certain function, activity or task. Almost all conventional applications include a user interface (UI) that is generated by the computer and rendered on a display, to visualize certain aspects of the application as well as enable user interaction with the application. Given the great variety among modern application development, hosting, and deployment platforms, there needs to be special consideration in providing external customers with a harmonized and unified UI that is built seamlessly and efficiently.

Conventional applications typically utilize only one version control system, and all developers of the combined application make contributions to same code repository. While various child applications or portions of the UI may be developed separately, all of the code is integrated in and tested from a common repository. Changes done by teams developing other child applications of the parent application can influence each other. For example, team A, who is working on a first child application of the parent application, may implement a bug that affects a second child application being worked on by team B. This issue may be difficult to discern until the application is integrated. It would be useful to have the ability to control for and/or identify such bugs at an earlier stage in the development process.

While the end-user "sees" only one application, the process of building the application from the various repositories storing the respective parent and child applications can be challenging and/or cumbersome. What is needed is a system and method to develop a harmonized UI application giving the teams the freedom of having their own code repository, and bringing the functionality together during build steps to have one consistent application facing the external consumers. Further, what is needed is having multiple applications reachable via the same web address in the same context without having each team to contribute to the same code repository. Finally, team-specific development processes need to be kept isolated from central build process, allowing each team to develop and test their part of the overall application independently, for an optimal development environment.

SUMMARY

This document describes a system and method to develop a harmonized UI application giving the teams the freedom of having their own code repository and bringing the functionality together during build steps to have one consistent application facing the external consumers. Multiple applications are reachable via the same web address in the same context without having each team to contribute to the same code repository. Yet, team-specific development processes are isolated from a central build process, allowing each team to develop and test their part of the overall application.

In one aspect, a system is disclosed for distributed user interface development for harmonization as a unified web-based application. The system includes an application frame repository hosting an application frame that defines a user interface for the web-based application, the application frame hosting one or more pages linked to the application frame by an application builder. The system further includes one or more code versioning repositories linked to the application frame repository via a communications network, each of the one or more code versioning repositories providing a page that corresponding to the one application frame, each of the one or more pages having at least one application function that is independently accessible from the application frame by a user that accesses the web-based application, each of the application functions being developed and stored in the code versioning repository independently from the application frame repository. The system further includes an application builder module, implemented by at least one computer processor, configured to access the one or more pages from the team specific code versioning repositories and assemble the one or more pages within the application frame to generate the unified web-based application upon a user request received by the system.

In another aspect, a method and instructions to instruct a computer processor include generating an application frame of a unified web-based application, the application frame defining a user interface of the unified web-based application. The method and steps further include storing the application frame in an application frame repository, and linking the application frame repository with a function library associated with the application frame, the function library comprising one or more reusable application functions. The method and steps further includes receiving, by one or more code versioning repositories, code representing one or more application functions of a page for integration within the application frame. The code for each page is developed in a development environment independent of the application frame repository but linked with the function library. The method and steps further include linking, by an application builder module, each of the one or more code versioning repositories with the application frame repository to build, during build time, the unified web-based application from the application frame and associated linked pages from the one or more code versioning repositories.

Implementations of the current subject matter can include, but are not limited to, systems and methods, as well as articles that comprise a tangibly embodied machine-readable medium operable to cause one or more machines (e.g., computers, etc.), to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like, consistent with one or more implementations, can be used to develop a harmonized UI application, giving the teams the freedom of having their own code repository and bringing the functionality together during build steps to have one consistent application facing the external consumers. Multiple applications are reachable via the same web address in the same context without having each team to contribute to the same code repository. Furthermore, team-specific development processes are still isolated from a central build process, allowing each team to develop and test their part of the overall application independently. However, the teams still have team specific build or test processes which ensure the consistency and functional correctness of their application.

Figure 1:
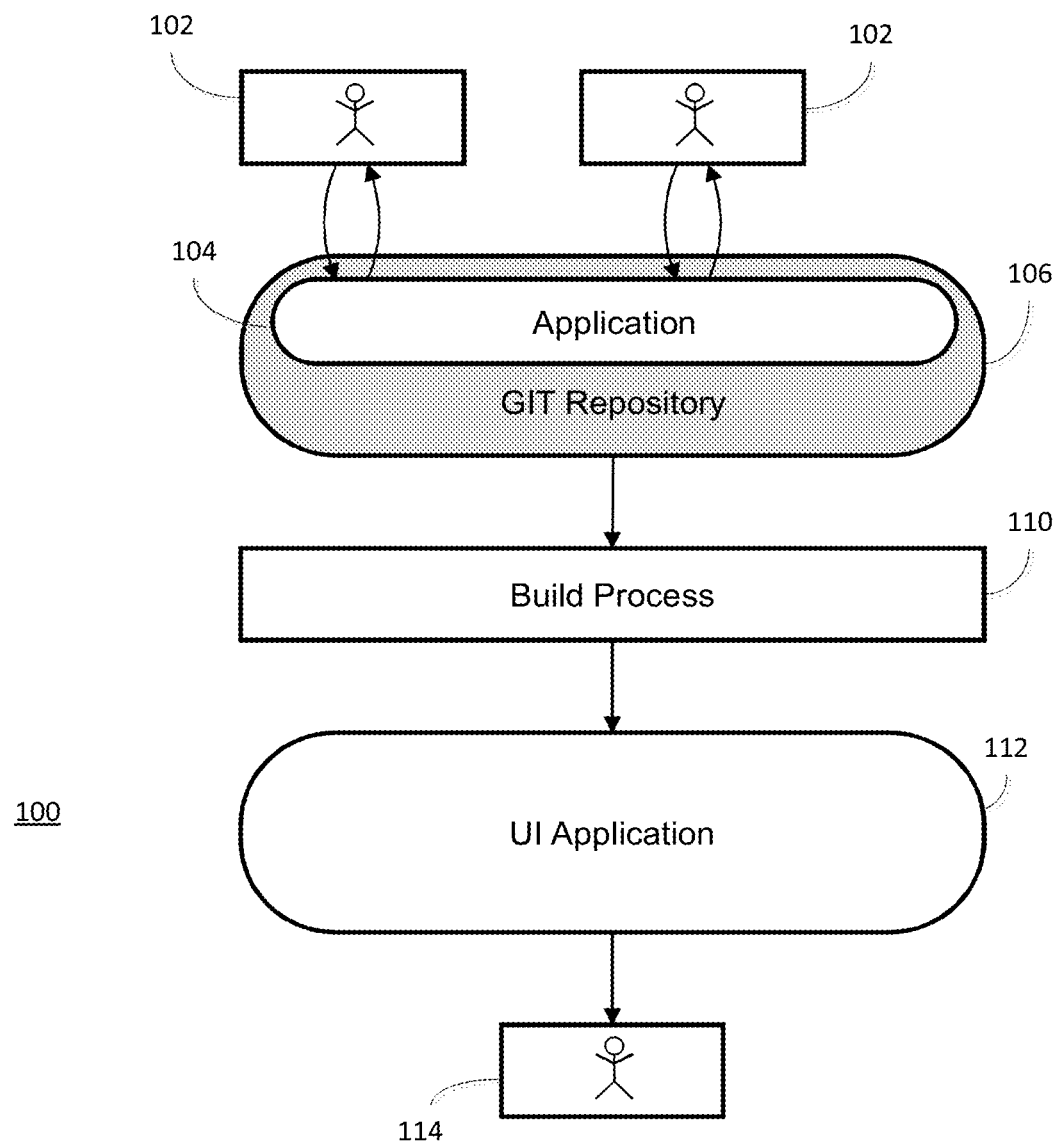
FIG. 1 illustrates an application development platform.
Figure 2:
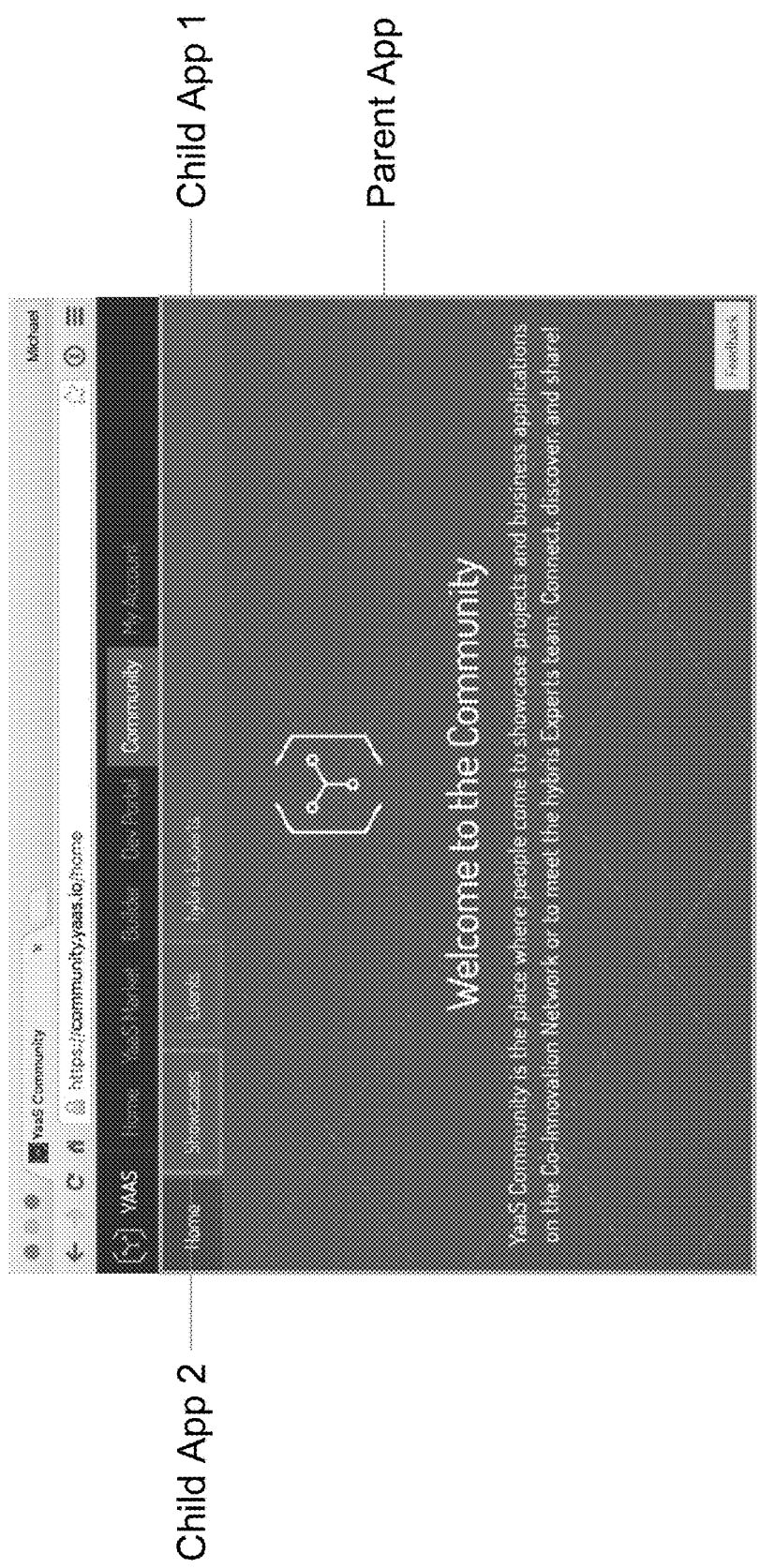
FIG. 2 illustrates an application UI with parent and child application parts.

FIG. 1 illustrates an application development platform 100. Two or more teams 102 develop a part, or child application 104, of an overall parent application 108. Each separate part includes its own functionality as provided by its own separate computer code. For example, one team may develop a "parent" application which includes a webpage as the UI, while one or more other teams will develop "child" applications to be rendered and displayed within a portion of the parent UI. Each child application 104 and the parent application 108 are stored in a GIT repository 106, and in some instances different repositories. A common build process 110 builds the parent application 108 with all child applications 104 to deploy the merged UI application 112 to an end user 114. FIG. 2 illustrates a merged application UI with parent and child application parts.

Figure 3:
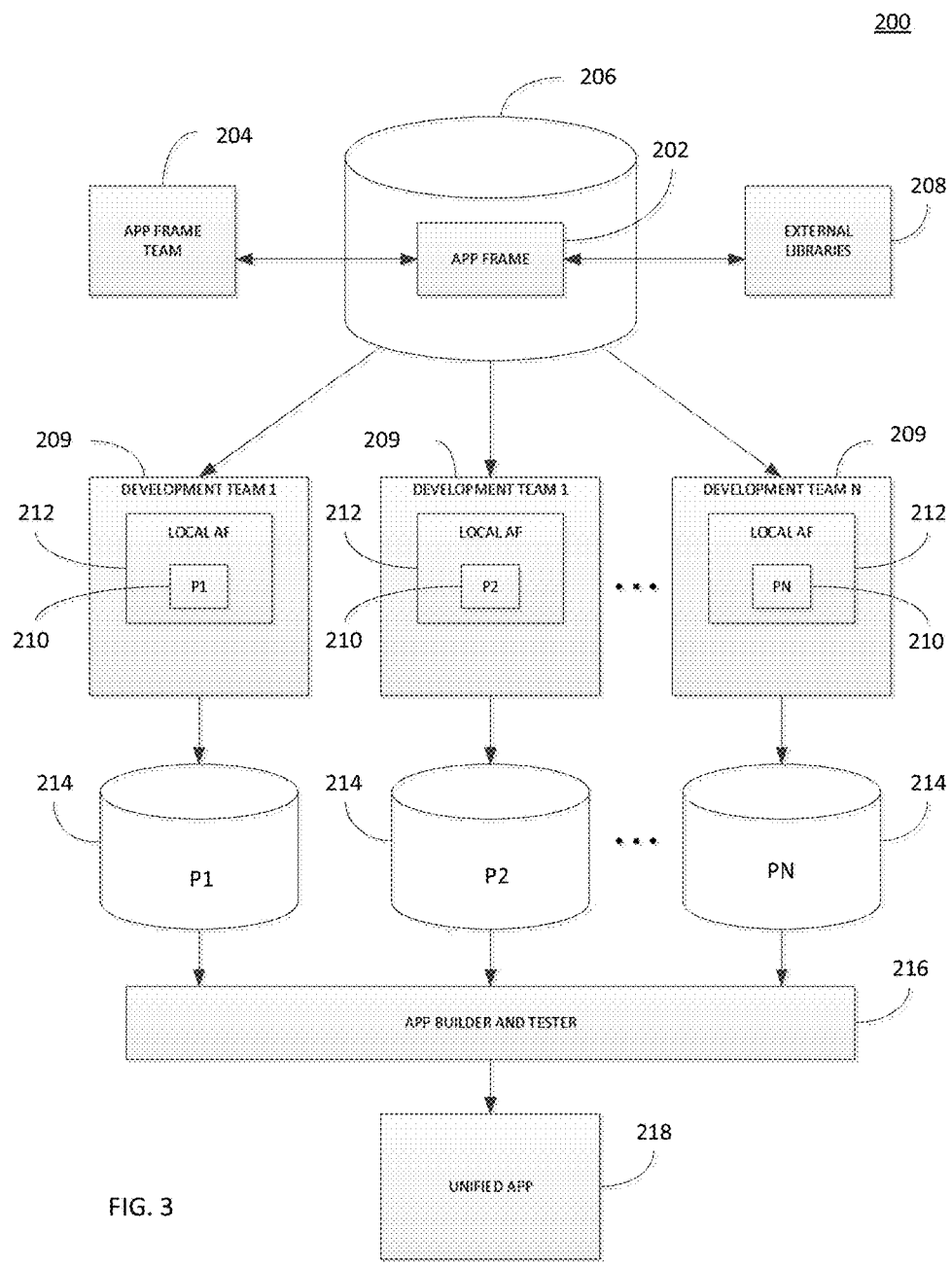
FIG. 3 illustrates a system for distributed application UI development.

FIG. 3 illustrates a system 200 for distributed application UI development, so that multiple UI application parts that are developed by different development teams can be harmonized as one application during build time. In accordance with some implementations, a main application, or parent application, is a configured as a shell that is also called an application frame 202. The application frame 202 is developed by an application frame development team, and stored in an application frame repository 206 that accesses and uses external libraries 208. The external libraries 208 store application data for the application frame 202, but can also be accessed by child applications as described below.

The application frame 202 is associated with one or more related child applications, called pages 210, which are anchored in the shell or application frame 202 via local application frames 212. Each page 210 (P1 . . . PN) can be developed autonomously by a separate development team 209 in a separate application development environment, which includes a program code and library that is used for the particular page. Each page 210 has a reference of the application frame 202.

In some instances, the application frame 202 can provide an integration mechanism with central, reusable functional application components to simplify application development of the child applications. Each page 210 can reuse the functions from the external libraries 208 which are provided by the application frame 202, and which can be accessible via the application frame repository 206.

In some implementations, a page 210 can access and incorporate specific libraries. Each page 210 can be built using an independent, team specific remote code versioning repository 214, and can be developed by its own dedicated team. Accordingly, each team can develop their page 210 with autonomy, and need only rely on the application frame 202 in the functionality it provides. The application frame 202 includes an application builder and tester 216, which collects all related pages 210 from the team specific remote code versioning repositories 214, and merges them into one holistic, unified application 218.

End-to-end and page-related tests executed by the application builder and tester 216 ensure the consistency of the merge application. The holistic application would be then deployed, and the end-user has an experience as if the application has been developed as a one piece.

Each team can develop parts of the application autonomously, and can test its implementation without being influenced by changes to other parts of the application made by other teams. During build time, all parts of the application are brought together into one application, and integration tests are run to ensure functional correctness of each part as well as the parent application. Thereafter, the consumer receives and interacts with a harmonized application which is accessible via the same URL and which has the impression of being one, unified application.

Figure 4:
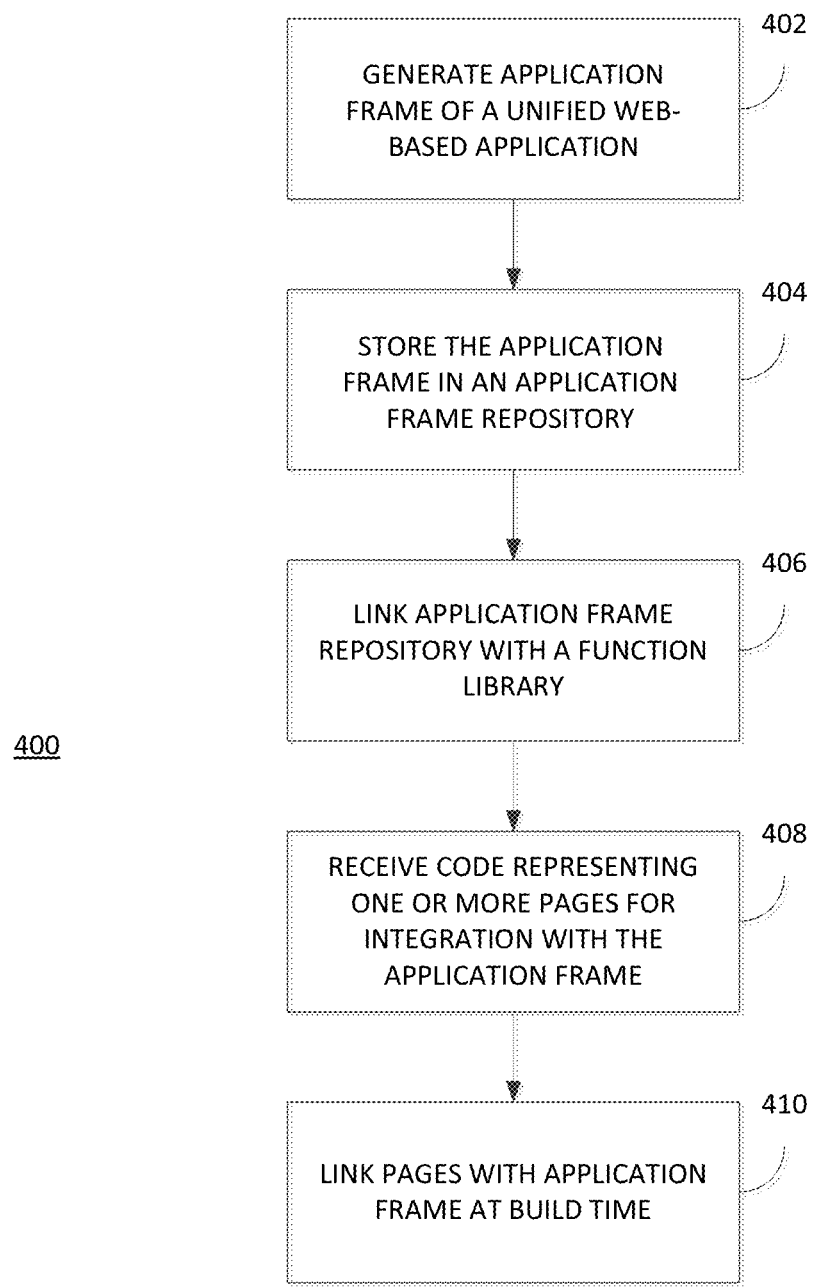
FIG. 4 is a flowchart of a method for developing a unified application from distributed pages.

FIG. 4 is a flowchart of a method 400 for developing a unified application from distributed pages. At 402, a computer processor generates an application frame of a unified web-based application, the application frame defining a user interface of the unified web-based application. At 404, the computer processor stores the application frame in an application frame repository. At 406, the application frame repository is linked with a function library associated with the application frame. The function library includes one or more reusable application functions. At 408, one or more code versioning repositories receive code representing one or more application functions of a page for integration within the application frame. The code for each page being developed in a development environment independent of the application frame repository but linked with the function library. At 410, an application builder module implemented by at least one computer processor links each of the one or more code versioning repositories with the application frame repository to build, during build time, the unified web-based application from the application frame and associated linked pages from the code versioning repositories.

Some benefits for the end-user include a reduced amount of data which has to be loaded over the network, latency and data, and quicker start time of the applications, as well as shared dependencies across the different pages. Further, there is only one single point for application entrance and usage. Only a single login is required of the frame to access the different pages, and thus, different functionalities. Accordingly, the user will not realize that the accessed application was the vehicle by which various functionalities, developed by distributed teams, were also accessed.

Benefits for development teams include each team being able to develop and test independent from any other team that is contributing to the same application as well as reuse of libraries as they are centrally managed by the team responsible for the application frame. The system and method include only one central security scan, approval process and maintenance for external functionality, which enables simplification for cross-pages integration tests within the application frame as a central build server can execute them. Versions of libraries can be controlled and managed centrally.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for distributed user interface development for harmonization as a unified web-based application, the system comprising:

an application frame repository hosting an application frame that defines a user interface for a web-based application, the application frame hosting one or more pages linked to the application frame, the application frame linked to a function library comprising a plurality of application functions;

a plurality of code versioning repositories linked to the application frame repository via a communications network, each of the plurality of code versioning repositories providing a page of the one or more pages linked to the application frame, each of the one or more pages having at least one application function of the plurality of application functions that is independently accessible from the application frame by a user that accesses the web-based application, each of the plurality of code versioning repositories configured to:

receive code representing the at least one application function for the page associated with corresponding code versioning repository, and store the code in the corresponding code versioning repository, the code developed in a development environment independent from the application frame repository; and an application builder module, comprising at least one computer processor, configured to:
retrieve the plurality of pages from corresponding code versioning repositories of the plurality of code versioning repositories,
assemble the one or more pages within the application frame to generate the unified web-based application at a build time, and
test, after the assembling, the unified web-based application for functional correctness of each of the one or more pages assembled in the unified web-based application.

2. The system in accordance with claim 1, wherein the application builder module includes an application tester to test each of the one or more pages of the unified web-based application before the one or more pages are assembled as the unified web-based application.

3. The system in accordance with claim 1, wherein each of the one or more pages includes a link to the application frame.

4. The system in accordance with claim 1, wherein the application frame includes integration mechanism with central, reusable functional application components for each of the one or more pages.

5. The system in accordance with claim 1, wherein the application frame is a shell associated with and separate from the web-based application.

6. The system in accordance with claim 1, wherein:
the one or more pages are a plurality of pages; and
each code versioning repository of the plurality of code versioning repositories is associated with a corresponding page of the plurality of the pages.

7. The system in accordance with claim 1, wherein the development environment is independent from the other code versioning repositories of the plurality of code versioning repositories.

8. The system in accordance with claim 1, wherein the development environment comprises a local application frame linked to the application frame and linked to the corresponding code versioning repository.

9. A method comprising:
generating, by at least one computer processor, an application frame of a unified web-based application, the application frame defining a user interface of the unified web-based application and hosting one or more pages linked to the application frame;
storing, by the at least one computer processor, the application frame in an application frame repository;
linking the application frame repository with a function library associated with the application frame, the function library comprising a plurality of application functions;
linking the application frame repository with a plurality of code versioning repositories, each of the plurality of code versioning repositories providing a page of the one or more pages linked to the application frame, each of the one or more pages having at least one application function of the plurality of application functions that is independently accessible from the application frame by a user that accesses the web-based application;

receiving, by a plurality of code versioning repositories, code representing the at least one application function for the page associated with corresponding code versioning repository;
storing the code in the corresponding code versioning repository, the code for each page developed in a development environment independent of the application frame repository but linked with the function library;
retrieving, by an application builder module implemented by the at least one computer processor, the plurality of pages from corresponding code versioning repositories of the plurality of code versioning repositories;
assembling, by the application builder module, the one or more pages within the application frame to generate the unified web-based application at a build time; and
testing, after the assembling, the unified web-based application for functional correctness of each of the linked pages in the unified web-based application.

10. The method in accordance with claim 9, further comprising testing, by the at least one computer processor, each of the one or more pages of the unified web-based application before the one or more pages are assembled as the unified web-based application.

11. The method in accordance with claim 10, further comprising delivering, via a communications network, the unified web-based application to an end user.

12. A system comprising:
at least one programmable processor; and
a machine-readable medium storing instructions that, when executed by the at least one processor, cause the at least one programmable processor to perform operations comprising:
generating an application frame of a unified web-based application, the application frame defining a user interface of the unified web-based application and hosting one or more pages linked to the application frame;
storing the application frame in an application frame repository;
linking the application frame repository with a function library associated with the application frame, the function library comprising a plurality of application functions;
linking the application frame repository with a plurality of code versioning repositories, each of the plurality of code versioning repositories providing a page of the one or more pages linked to the application frame, each of the one or more pages having at least one application function of the plurality of application functions that is independently accessible from the application frame by a user that accesses the web-based application;
receiving code representing the at least one application function for the page associated with corresponding code versioning repository;
storing the code in the corresponding code versioning repository, the code for each page developed in a development environment independent of the application frame repository but linked with the function library;
retrieving the plurality of pages from corresponding code versioning repositories of the plurality of code versioning repositories;
assembling the one or more pages within the application frame to generate the unified web-based application at a build time; and testing, after the assembling, the unified web-based application for functional correctness of each of the linked pages in the unified web-based application.

13. The system in accordance with claim 12, wherein the operations further comprise testing each of the one or more pages of the unified web-based application before the one or more pages are assembled as the unified web-based application.

14. The system in accordance with claim 13, wherein the operations further comprise delivering, via a communications network, the unified web-based application to an end user.

\* \* \* \* \*